(12) United States Patent
Shiga

(10) Patent No.: US 6,963,984 B2
(45) Date of Patent: Nov. 8, 2005

(54) COMPUTER POWER SUPPLY STARTUP APPARATUS

(75) Inventor: Sadakazu Shiga, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 918 days.

(21) Appl. No.: 09/760,399

(22) Filed: Jan. 12, 2001

(65) Prior Publication Data

US 2001/0009027 A1 Jul. 19, 2001

(30) Foreign Application Priority Data

Jan. 17, 2000 (JP) .......................... 2000-007632

(51) Int. Cl.⁷ .............................................. G06F 1/26
(52) U.S. Cl. ........................... 713/310; 713/323; 710/5; 710/67
(58) Field of Search .............................. 713/300, 310, 713/320, 323, 324; 710/5, 15, 18, 67; 324/178; 200/502, 510, 520, 530; 307/64, 85, 112, 125, 126, 130, 131, 132 E

(56) References Cited

U.S. PATENT DOCUMENTS

| | | | |
|---|---|---|---|
| 4,918,649 A | | 4/1990 | Nishimura |
| 5,553,296 A | * | 9/1996 | Forrest et al. ............... 713/323 |
| 5,590,343 A | * | 12/1996 | Bolan et al. ................. 713/300 |
| 5,742,514 A | | 4/1998 | Bonola |
| 5,799,196 A | * | 8/1998 | Flannery ...................... 713/320 |
| 6,041,413 A | * | 3/2000 | Wang .......................... 713/202 |
| 6,092,207 A | * | 7/2000 | Kolinski et al. ............. 713/323 |
| 6,256,682 B1 | * | 7/2001 | Gudan et al. ................. 710/14 |
| 6,275,947 B1 | * | 8/2001 | Wang .......................... 713/300 |
| 6,298,447 B1 | * | 10/2001 | Wang .......................... 713/202 |

FOREIGN PATENT DOCUMENTS

| | | |
|---|---|---|
| DE | 43 25 383 A | 2/1995 |
| DE | 198 23 028 A | 12/1998 |

* cited by examiner

*Primary Examiner*—Rehana Perveen
*Assistant Examiner*—Thuan Du
(74) *Attorney, Agent, or Firm*—Brinks Hofer Gilson & Lione

(57) ABSTRACT

In order to turn on the main power unit, when it is off, of a computer in a turned-off state from a keyboard, power is supplied from an auxiliary power unit to a USB controller on the keyboard unit side and a power supply startup unit on the computer side, and on the other hand when power supply to a line switching unit is cut off, switching sections are switched over to connect signal lines of the USB controller and input terminals of a differential amplifying unit, respectively. When a specific signal is supplied from the keyboard unit, a power supply startup signal (power ON signal) is supplied from the power supply startup unit to the main power unit to enable the main power unit to be started up.

4 Claims, 1 Drawing Sheet

COMPUTER POWER SUPPLY STARTUP APPARATUS

BACKGROUND OF THE INVENTION

1. Field of the Invention

The present invention relates to a computer power supply startup apparatus, and more particularly to a computer power supply startup apparatus for starting up main power supply to a computer by keyboard operation from a state in which the main power supply to the computer is off.

2. Description of the Related Art

Usually a cable extends from a power supply unit provided in a computer, and at the farther end of the cable is provided a connector, which is connected to a mother board, a hard disk unit, a floppy disk unit, a CD-ROM drive and other units within the computer to supply power to these units.

The power supply unit generates direct currents of 5 V and 12 V from an alternating current of 100 V from a commercial power source. The DC 12 V output is mainly used for driving motors of the hard disk and CD-ROM drive units, and the DC 5V output, for driving the internal circuits of the computer including the CPU and memories and control circuits for the hard disk drive and other units.

When cutting off power supply to the computer, the user may either turn off the power switch provided on the power supply unit or cut off power supply to the computer from an input device such as a keyboard unit. Power supply to the computer may as well be cut off by setting a suspended state while keeping the state of the computer as it is in other respects.

However, if it is desired to start up the main supply to the computer when it is off or suspended, there is the inconvenience that no other alternative is available than to turn on the power switch.

For this reason, if the main drive unit of the computer is not near the keyboard unit (e.g. it is under the desk), the user is obliged to take the trouble of moving to a position where he or she can reach the power switch and turn in on.

SUMMARY OF THE INVENTION

An object of the present invention is to solve the above-mentioned problem by providing a computer power supply startup apparatus for permitting its main power supply, when it is off, to be started up by operating an input unit such as a keyboard unit.

According to the invention, there is provided a computer power supply startup apparatus consisting of a computer equipped with a signal control section; an input unit for this computer; a communicative connecting unit for connecting the computer and the input unit; a main power unit for supplying power to the computer and the input unit; an auxiliary power unit for supplying power to the computer and the input unit when the main power unit is off; a power supply startup unit, provided within the computer, for supplying a startup signal to the main power unit; and a line switching unit for connecting, when the main power unit is on, the communicative connecting unit between the input unit and the signal control section and, when the main power unit is off, switching the communicative connecting unit to connection between the input unit and the power supply startup unit.

According to the invention, the main power unit provided on the main drive unit of the computer can be started up by operating a keyboard or some other input unit. Therefore, the user need not move, every time he or she wants to turn on the power switch of the main power unit, to a position from where the switch is accessible.

For the configuration outlined above, it is preferable that the main power unit of the computer, when it is off, be started up by the supply of a predetermined signal from the input unit to the power supply startup unit.

It is further preferable for the input unit to have a plurality of input keys and for the predetermined signal to be issued when one or more specific key or keys are operated.

In the above-described configuration, the main power unit is not started up unless a specific key or keys are pressed. Therefore, even if anyone presses a key or keys on the keyboard unit by mistake when the main power unit is off, unintended startup of the main power unit can be prevented.

The predetermined signal to be given from the input unit to the power supply startup unit is, for instance, a resume signal supplied more than once.

In this case, the communicative connecting unit is a USB interface, and the line switching unit may consist of a relay or an analog switch.

DETAILED DESCRIPTION OF THE PREFERRED EMBODIMENT

Figure 1:
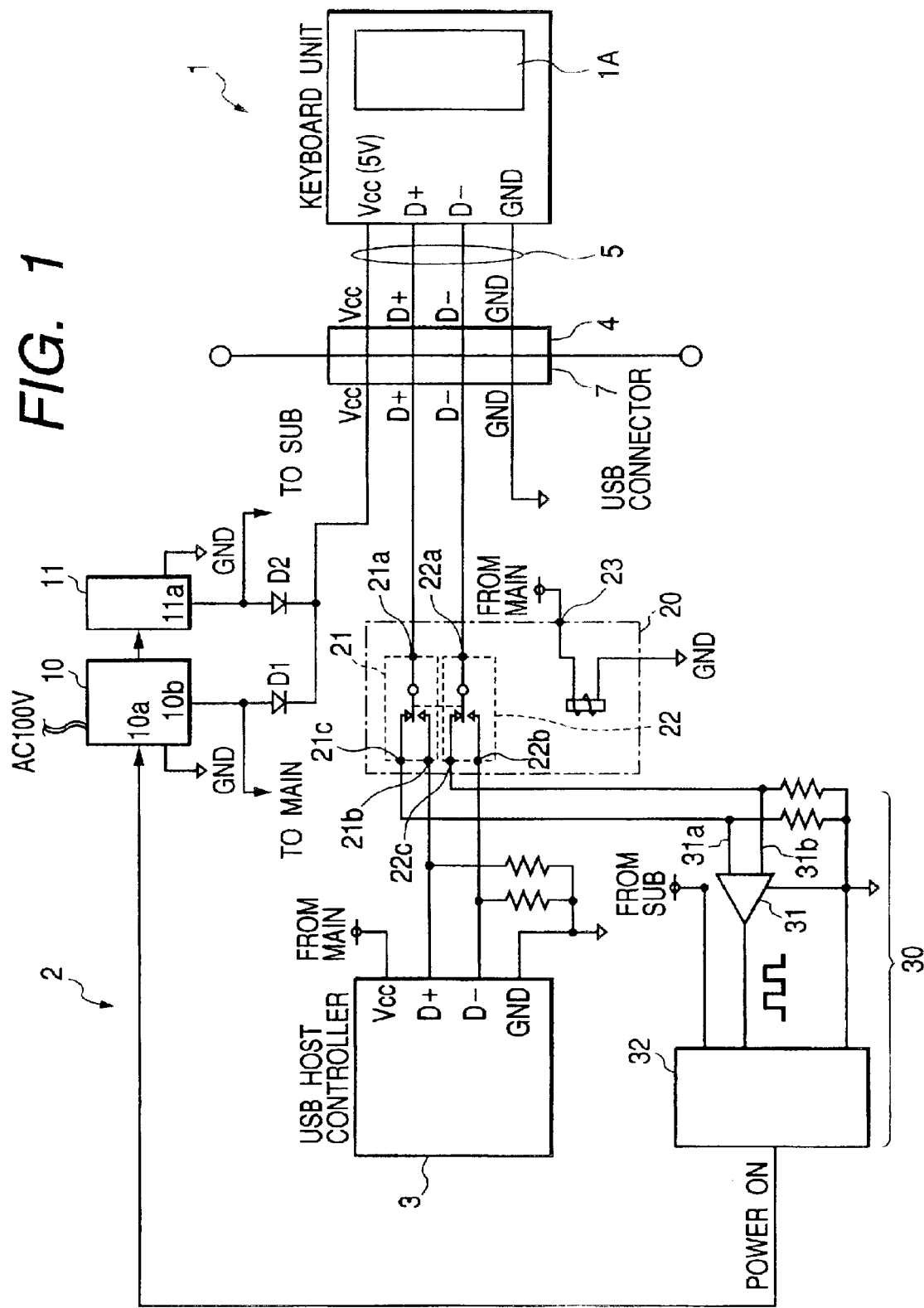
FIG. 1 illustrates the configuration of a computer power supply startup apparatus, which is a preferred embodiment of the present invention.

The invention will now be described in detail below with reference to the accompanying drawing.

FIG. 1 illustrates the configuration of a computer power supply startup apparatus, which is a preferred embodiment of the present invention.

In FIG. 1, with respect to a boundary line O—O, the right side shows a USB-compatible keyboard unit 1 (input unit) and the left side, a computer 2. The keyboard unit 1 and the computer 2 are connected to each other by a USB (Universal Serial Bus) interface (communicative connecting unit). The keyboard unit 1 is provided with a USB controller section 1A, while the computer 2 is provided with a host controller section (signal control section) 3.

The keyboard unit 1 is fitted with a connecting cable 5 having at its tip a USB input/output connector 4, and is connected to an input/output connector 7 provided on the computer 2. The USB interface has altogether four power lines (power Vcc and GND) and signal lines (D+ and D−), and these four lines connect the input/output connector 7 and the keyboard unit 1.

Within the computer 2 are provided the main power unit 10 and the auxiliary power unit 11 for supplying electric power to, for instance, the hard disk unit, the floppy disk unit and the mother board. The main power unit 10 converts commercial power (AC 100 V) supplied from an outside source into direct currents of DC 5 V and DC 12 V for example. The main power unit 10 is also provided with a signal input section 10a which, when a predetermined signal is entered, can turn on and off the main power unit. On the other hand, the auxiliary power unit 11, consisting of a battery or the like capable of supplying DC 5 V for instance, is charged by the main power unit 10 when the main power unit 10 is on, and supplies power when the main power unit 10 is off.

The outputs from a DC 5 V output section 10b of the main power unit 10 and an output section 11a (DC 5 V) of the auxiliary power unit 11 are connected to diodes D1 and D2, and further to the Vcc terminal of the input/output connector 7. The GND terminals of the main power unit 10 and the auxiliary power unit 11 are connected to the GND terminal of the input/output connector 7. Therefore, predetermined power is supplied to the keyboard unit 1 via the connecting cable 5.

As illustrated in FIG. 1, between the USB host controller section 3 and the input/output connector 7 within the computer 2 is provided a line switching unit 20. The line switching unit 20 consists of, for instance, a relay or an analog switch. The line switching unit 20 is provided with two sets of switching sections 21 and 22 and a common control terminal 23. The switching section 21 has one fixed input/output section 21a and two switchable input/output section 21b and 21c, and the switching section 22 has one fixed input/output section 22a and two switchable input/output sections 22b and 22c. The switchable input/output sections 21b and 22b of the switching sections 21 and 22 are connected to the D+ terminal and the D− terminal, respectively, of the USB host controller section 3.

Within the computer 2 is provided a power supply startup unit 30, consisting of a differential amplifying unit 31, which is supplied with power from and driven by the auxiliary power unit 11, and a signal distinguishing unit 32. The differential amplifying unit 31 consists of an OP amplifier, whose input terminals 31a and 31b are connected to the other switchable input/output section 21c and 22c, respectively, of the switching sections 21 and 22 of the switching unit 20. The signal distinguishing unit 32 may consist of, for instance, a memory section, a determining section and a pulse output section. When the determining section determines that a specific signal has been entered from the differential amplifying unit 31, the pulse output section supplies a startup signal to the main power unit 10.

The actions of the above-described configuration of the present invention will be described below.

(Action when Power Supply to the Main power Unit is Cut Off)

When the power switch (not shown) of the main power unit 10 is on, power is supplied from the output section 10b of the main power unit 10 to sections marked with MAIN in FIG. 1. Thus, DC 5 V is supplied to the power input terminal Vcc of the USB host controller section 3 and the control terminal 23 of the line switching unit 20. Power is also supplied to the keyboard unit 1 via the USB interface, i.e. to between the power input Vcc (5 V) and the GND of the USB controller section 1A of the keyboard unit 1, via the input/output connectors 7 and 4 and the connecting cable 5.

At this time, as the fixed input/output section 21a is connected to the switchable input/output section 21b, and the fixed input/output section 22a to the switchable input/output section 22b in the switching sections 21 and 22 of the line switching unit 20, there is set a state permitting communication between the USB host controller section 3 on the computer 2 and the USB controller section 1A on the keyboard unit 1 side.

By pressing a specific key (e.g. a dedicated power-off key), or a combination of specific keys, on the keyboard unit 1, power-off information is caused to be notified to the computer 2 side via the signal lines D+ and D− in the USB interface. Upon receiving this signal, programmed processing to turn off the power switch is executed on the computer 2 side, and the main power unit 10 is turned off.

(Action when Power Supply to the Main Power Unit is Turned On)

As the main power unit 10 is turned off, power supply to the control terminal 23 of the line switching unit 20 is cut off, and the connection states in the switching sections 21 and 22 are reversed. Thus in the switching sections 21, while the fixed input/output section 21a and the switchable input/output section 21b are disconnected, the fixed input/output section 21a and the switchable input/output section 21c are connected instead. At the same time in the switching sections 22, while the fixed input/output section 22a and the switchable input/output section 22 are disconnected, the fixed input/output section 22a and the switchable input/output section 22c are connected instead.

To the power input terminal Vcc of the keyboard unit 1 is supplied power from the auxiliary power unit 11 via the input/output connectors 7 and 4 and the connecting cable 5. As a result, even if power supply from the main power unit 10 is cut off, it is still possible to supply power to the keyboard unit 1. Incidentally, it is preferable for the consumption of electric current at this time is kept at or below 500 $\mu$A as in the suspended state according to the USB standard.

Even when the main power unit 10 is off, power is supplied to the differential amplifying unit 31 and the signal distinguishing unit 32 from the auxiliary power unit 11. However, as the power supply startup unit 30 is standing by for input from the keyboard unit 1, little power is consumed by the power supply startup unit 30, and therefore power can be supplied from the auxiliary power unit 11 for a long period.

When in this state a specific key (e.g. a dedicated power-on key), or a combination of specific keys, on the keyboard unit 1 is pressed, a specific signal is supplied from the USB controller section 1A via the signal lines D+ and the D− of USB, and this specific signal can be entered between the input terminals 31a and 31b of the differential amplifying unit 31 of the power supply startup unit 30. Then, the differential amplifying unit 31 delivers the differentially supplied specific signal to the signal distinguishing unit 32. The signal distinguishing unit 32 determines with its determining section whether or not the predetermined signal stored in the memory section and the entered signal are identical and, if they are, supplies a power supply startup signal (power ON signal) from the pulse output section to the main power unit 10. This enables the main power unit 10 to be started up. Or if the determining section determines that the two signals are not identical, the power supply startup signal is not supplied, and the main power unit 10 is kept off.

To add, the specific signal (differential output signal) should preferably be a kind of signal that cannot be artificially generated, for instance a resume signal (5 msec to 15 msec in pulse width) according to the USB standard consecutively supplied at predetermined intervals (e.g. three pulses). If in this way the specific signal supplied from the keyboard unit 1 is set to be one that can never be artificially generated, not by chance either, even if a key on the keyboard unit 1 is pressed by mistake, or some combination of signals are supplied from the keyboard unit 1 to the differential amplifying unit 31 of the power supply startup unit 30 when the main power unit 10 is off, the determining section will determine the two signals not to be identical, and accordingly erroneous startup of the main power unit 10 can be prevented.

The main power unit 10 can be prevented from being started up a noise signal or the like either.

According to the present invention hitherto described in detail, it is made possible to start up the main power unit of the computer from the keyboard unit. Therefore, it is made possible to carry out on/off control from the keyboard unit over the main power unit of the computer itself.

What is claimed is:

1. A computer power supply startup apparatus, comprising: a computer equipped with a signal control section; an input unit for this computer; a communicative connecting unit for connecting the computer and input unit; a main power unit for supplying power to the computer and input unit; an auxiliary power unit for supplying power to the computer and input unit when the main power unit is off; a power supply startup unit having a differential amplifier, provided within the computer, for supplying a startup signal to the main power unit; and a line switching unit for connecting, when the main power unit is on, the communicative connecting unit between the input unit and the signal control section and, when the main power unit is off, switching the communicative connecting unit to connection between the input unit and power supply startup unit, wherein the main power unit of the computer is started up upon supply of a predetermined signal from the input unit to the power supply startup unit when the main power unit is off, the communicative connecting unit is a USB interface, and the line switching unit includes one of a relay and an analog switch.

2. A computer power supply startup apparatus, according to claim 1, wherein the input unit has a plurality of input keys, and the predetermined signal is issued when one or more specific key or keys are operated.

3. A computer power supply startup apparatus, according to claim 2, wherein the predetermined signal provided from the input unit to the power supply startup unit is a resume signal supplied a plurality of times.

4. A computer power supply startup apparatus according to claim 1, wherein the auxiliary power unit comprises a rechargeable battery.

\* \* \* \* \*